July 8, 1941.  J. LANDE  2,248,095
ELECTROMAGNETIC SIGNAL ACTUATOR
Filed April 11, 1938
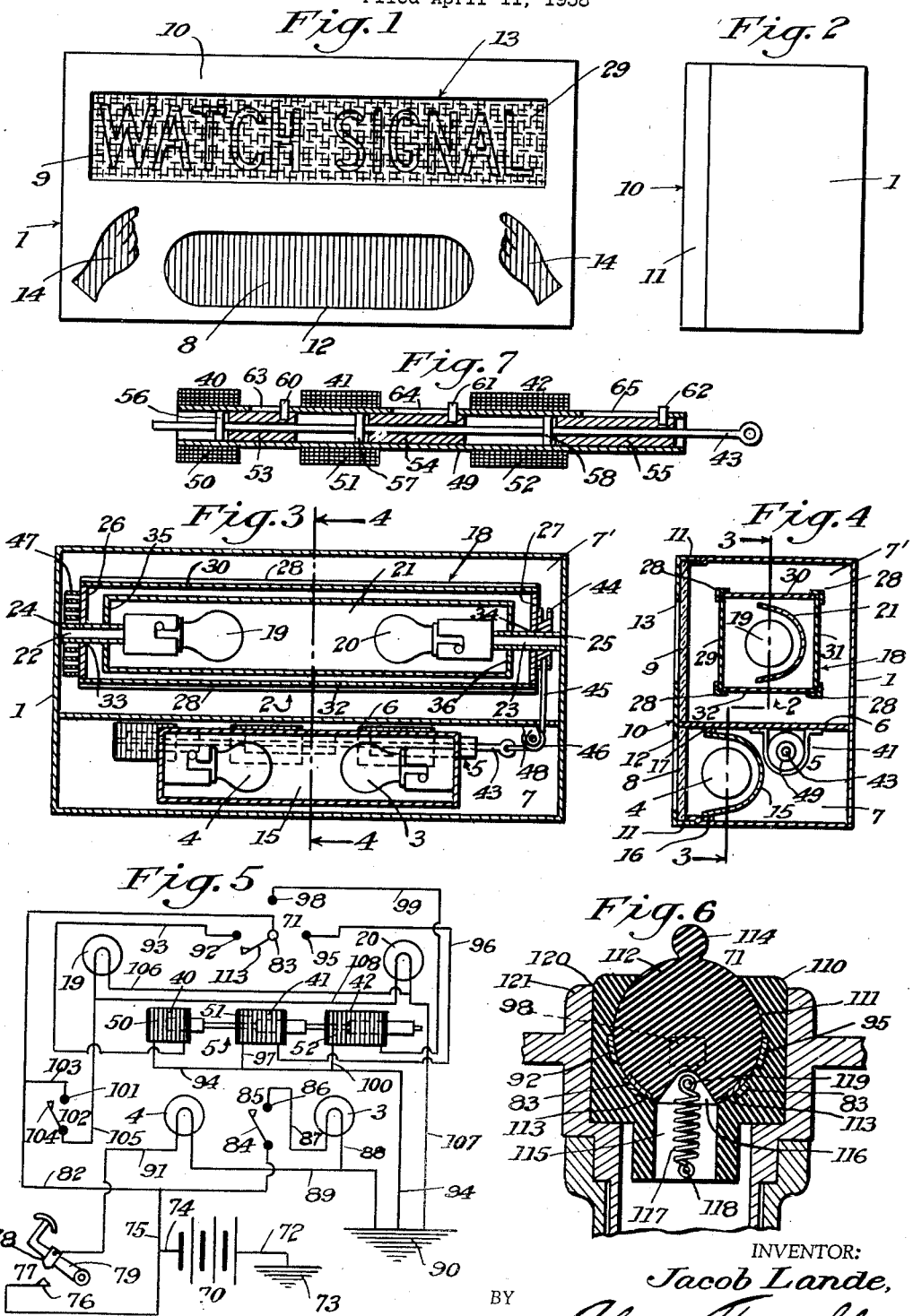
INVENTOR:
Jacob Lande,
BY Alan Franklin
ATTORNEY Patented July 8, 1941

2,248,095

UNITED STATES PATENT OFFICE 2,248,095

ELECTROMAGNETIC SIGNAL ACTUATOR

Jacob Lande, Los Angeles, Calif.

Application April 11, 1938, Serial No. 201,314

1 Claim. (Cl. 175—337)

This invention relates to motor vehicle signals, and the general object of the invention is to provide an improved signal particularly useful for motor vehicles which may be easily and correctly read, whereby accidents, caused by misunderstanding of signals on motor vehicles, will be reduced to a minimum.

Another object is to provide a motor vehicle signal which may be operated to display a stop signal before the conventional stop signal light, associated with the tail light, is lighted by depressing the brake pedal and applying the brakes of a motor vehicle, thus enabling the driver of a motor vehicle to give more timely warning that he intends to bring the motor vehicle to a stop.

Other objects and advantages will appear hereinafter.

The invention is illustrated in the annexed drawing which forms a part of this specification and in which:

Fig. 1 is a rear elevation of my signal.

Fig. 2 is an end elevation of my signal.

Fig. 3 is a vertical longitudinal section of my signal taken on line 3—3 of Fig. 4.

Fig. 4 is a transverse vertical section of my signal taken on line 4—4 of Fig. 3.

Fig. 5 is a diagram of the electric circuit for operating my signal.

Fig. 6 is a cross section of the switch for controlling the signal operating circuit shown in Fig. 5.

Fig. 7 is a longitudinal section of the solenoids of the operating mechanism of my invention as illustrated in Figs. 1 to 6 inclusive.

Referring more particularly to the drawing in which corresponding parts are designated by the same reference characters in all of the figures, my invention includes generally a casing 1, a rotatable signal member 2 mounted in said casing, a tail light 3 mounted in said casing, a stop signal light 4 associated with said tail light, and operating means 5 for said rotatable signal member 2.

The casing 1 is preferably mounted on the rear end of a motor vehicle directly above the license plate of said motor vehicle, so that the rays of the tail light 3 and the stop signal light 4 may be projected straight downwardly through the bottom of said casing 1 over the face of said license plate. Said casing is divided by a horizontal partition 6 into a lower compartment 7 and an upper compartment 7', in which compartments are respectively mounted the tail light 3 and stop signal light 4, and the rotatable signal 2. The rear of the compartment 7 is covered by a red glass panel 8, while the rear of the compartment 7' is covered by a clear glass panel 9, which glass panels are held in position against the rear flanged edges of the casing 1 and partition 6 by a cap plate 10 which fits against the rear or outer face of said glass panels with its flanged edges 11 fitted tightly over the rear edges of said casing. The plate 10 is formed with two openings 12 and 13, the opening 12 being located opposite the lower compartment 7 and the opening 13 being located opposite the upper compartment 7', so that the tail light 3 and the stop signal light 4 may be observed through said opening 12 and the red glass panel 8, and the rotatable signal member 2 may be observed through said opening 13 and the clear glass panel 9. Openings 14 are also provided in the plate 10 at the ends respectively of the opening 12, which openings 14 are in the form of hands pointing upwardly to the signal on the rotatable signal member 2 appearing through the opening 13 in the plate 10.

The tail light 3 and the stop signal light 4 are mounted in the ends respectively of a reflector 15 which is secured at its lower edge at 16 to the rear edge of the bottom wall of the casing 1 and at its upper edge at 17 to the rear edge of the partition 6, so that said reflector will reflect the rays of the tail light 3 and stop signal light 4 through the red glass panel 8 and the openings 12 and 14 in the plate 9.

The rotatable signal member 2 comprises a four-sided elongated box-shaped signal rotor 18, a pair of electric lights 19 and 20, and a light reflector 21. The signal rotor 18 is journaled at its ends within the compartment 7 on tubular journals 22 and 23 secured on the end walls of the casing 1, at 24 and 25, respectively. Said signal rotor comprises end walls 26 and 27, four longitudinal corner angle bars 28 secured at their ends to corresponding corners of said end walls and four glass panels 29, 30, 31 and 32 mounted respectively in opposite corner angle bars 28 and between the end walls 26 and 27, said end walls being formed with bearings 33 and 34 which are turnably fitted on the journals 22 and 23 respectively, whereby the signal rotor 18 is journaled at its ends. The lights 19 and 20 are secured on the inner ends of the tubular journals 22 and 23 respectively, within the reflector 21, which reflector is mounted within the signal rotor 18, by means of its end walls 35 and 36 secured on said journals respectively, with the reflector in position to reflect the rays of the lights 19 and 20 rearwardly through any one of the glass panels 29, 30, 31 or 32, and through the glass panel 9 of the casing 1 and the opening 13 in the rear cap plate 10, in the manner hereinafter described. The glass panels 29, 30, 31 and 32 respectively contain suitable words for indicating different signals and said panels are of different colors for further distinguishing the different signals. The panel 29 contains the words "Watch signal" and appears through the opening 13 in the plate 10 and through the glass panel 9 of the casing 1, when the motor vehicle travels straight ahead. Said panel 29 is amber in color with the letters of the words "Watch signal" of a lighter shade of amber than the remainder of the panel, so that the rays of the lights 19 and 20 will appear brighter through said letters than through the remainder of the panel. The panel 30 contains the words "I turn right" and is green, with the letters of said words a lighter green. The panel 31 contains the words "I turn left" and is blue, with the letters of said words a lighter shade of blue. The panel 32 contains the word "Stop" and is red, with the letters of said word a lighter shade of red. The colors of the panels may be changed to suit requirements.

The operating mechanism 5 for the rotatable signal member 2 includes three solenoids 40, 41 and 42, a rod 43 on which the cores of said solenoids are operatively mounted, a pulley 44 loose on the journal 23 and secured to the end wall 27 of the signal rotor 18, a cord 45 secured at one end to one end of the rod 43 and extending over a guide sheave 46 and over the pulley 44 and secured to said pulley, and a spiral spring 47 surrounding the journal 22 and secured at one end to said journal and at its other end to the end wall 26 of the signal rotor 18, which spring normally holds said signal rotor in position with its panel 29 opposite the glass panel 9 and the opening 13 in the plate 10, as shown in Fig. 4 of the drawing, with the words "Watch signal" exposed through said opening. The sheave 46 is journaled in a bracket 48 depending from the lower side of the partition 6. A tube 49 extends through the coils 50, 51 and 52 of the solenoids 40, 41 and 42, and the cores 53, 54 and 55 of said solenoids are slidably fitted in said tube, while said cores are slidably fitted on the pull rod 43 which extends through said tube. Abutments 56, 57 and 58 are secured on said pull rod for engaging one end of the cores 53, 54 and 55, respectively, whereby the solenoids 40, 41 and 42, when energized, pull the rod 43 and cord 45 for operating the signal rotor 18. Pins 60, 61 and 62 project from the remote ends of the cores 53, 54 and 55, respectively, through longitudinal slots 63, 64 and 65 respectively, in the tube 49, which pins engage the remote ends of said slots respectively to limit the turning movement of the signal rotor 18, under the influence of the spring 47, in position with the rotor panel 29 opposite the casing panel 9 and the plate opening 13, exposing the words "Watch signal" on said rotor panel through said casing panel and said plate opening.

My signal is operated by an electric circuit shown in Fig. 5 of the drawing, the power of which is supplied by a battery 70 and said circuit is controlled by a switch 71. One pole of said battery is connected by a lead 72 to ground 73, and the other pole of said battery is connected by a lead 74 to a lead 75, which lead connects at one end to one contact 76 of a brake pedal switch 77, which has its other contact 78 mounted on the brake pedal 79 of the motor vehicle on which my signal is mounted. The other end of the lead 75 is connected to a lead 82, which is connected at one end to the contact 83 of the controlling switch 71, and at its other end to one contact 84 of the tail light switch 85, the other contact 86 of said tail light switch being connected to a lead 87, which in turn is connected to one terminal of the tail light 3. The other terminal of said tail light is connected to a lead 88 which in turn connects to a lead 89, one end of which connects to ground 90, while its other end connects to one terminal of stop signal light 4. A lead 91 connects the other terminal of said stop signal light 4 and the contact 78 of the brake pedal switch 77. From contact 92 of the controlling switch 71 a lead 93 extends to one end of the coil 50 of the solenoid 40, the other end of said solenoid coil being connected to a lead 94 which extends to ground 90. From contact 95 to controlling switch 71 a lead 96 extends to one end of the coil 51 of the solenoid 41, the other end of said solenoid coil being connected by a lead 97 to the ground lead 94. From contact 98 of controlling switch 71 extends a lead 99 to one end of the coil 52 of solenoid 42, the other end of said solenoid coil being connected by a lead 100 to the ground lead 94. From contact 101 of a light switch 102 extends a lead 103 which connects to lead 82, the other contact 104 of said switch being connected to a lead 105 which connects to one terminal of the signal light 19. The other terminal of said signal light is connected to a lead 106 which in turn connects to a lead 107 which connects to ground 90 and to one terminal of signal light 20. The other terminal of said signal light is connected to a lead 108 which connects to lead 105.

The controlling switch 71 includes a block of insulation 110, provided with a spherical-shaped socket 111 extending through the upper side of said block, and a spherical switch member 112 turnably fitted in said socket, and extending through the open upper side thereof, there being a ring contact 113 countersunk in the lower portion of the surface of said spherical switch member 112 for engaging the contacts 83, 92, 95 and 98, which are countersunk within the surface of the socket 111 in the insulation block 110. The contact 83 is in the form of a ring and is located in the lower portion of the socket 111 in such position that it is at all times in contact with the ring contact 113 of the switch member 112. The contacts 92, 95 and 98 are spaced above the ring contact 83 and are spaced ninety degrees apart around the socket 111, so that the switch member 112 may be swung three ways to cause the ring contact 113 to bridge the ring contact 83 and any one of said contacts 92, 95 or 98. A knob 114 is formed on the upper side of the switch member 112 for turning the same to operate the switch 71. The block 110 is provided with an opening 115 in its lower side communicating with the lower side of the socket 111 and with a conical socket 116 in the lower side of the switch member 112, in which opening and socket is positioned a spring 117, which is connected at its lower end, at 118, to the block 110, and at its upper end, at 119, to the switch member 112, said spring normally holding the switch member 112 in its neutral position out of contact with any of the contacts 92, 95 and 98, as shown in Figs. 5 and 6. The switch 71 as shown in Fig. 6 may be mounted on the steering wheel of a motor vehicle, the block 110 being fitted in a socket 120 in the upper side of the hub 121 of the steering wheel.

The operation of my invention as above described is as follows:

Normally the signal rotor 18 is held in position by spring 47 with its panel 29 and the words thereon "Watch signal" exposed through the signal opening 13 in plate 10. When the signal is used the switch 102 is closed and the lights 19 and 20 are lighted, the current passing from battery 70 through leads 74, 75, 82, 103, switch contacts 101 and 104, lead 105, light 19, leads 106 and 108, light 20, and lead 107 to ground 90, and from ground 73 through lead 72 back to battery 70.

When the driver of the motor vehicle on which my signal is mounted decides to turn right he grasps the knob 114 of switch 71 and swings the switch member 112 to the right until the annular contact 113 bridges the contacts 83 and 92, whereupon current flows from battery 70 through leads 74, 75 and 82, contacts 83, 113 and 92, lead 93, coil 50 of solenoid 40, lead 94 to ground 90, and from ground 73 through lead 72 back to battery 70, and the core 53 is drawn into said solenoid coil against the abutment 56, whereby the rod 43 is moved correspondingly with said core and the signal rotor 18, through said rod, cable 45 and pulley 44, is rotated counter-clockwise 90 degrees (Fig. 4) until the rotor panel 30 is brought opposite the opening 13 in plate 10, so that said panel and the words thereon, "I turn right," are exposed through said opening and lighted by the lights 19 and 20, the rotor being limited in its 90 degree counter-clockwise movement by the engagement of the pin 60 on the solenoid core 53 with the left end of the slot 63 (Fig. 7). After the signal is given the switch knob 114 is released and the switch spring 117 swings the switch member 112 back to neutral position as shown in Fig. 6, disengaging contact 113 from contact 92 and breaking the signal rotor circuit, whereupon the spring 47 rotates the rotor 18 backwardly or clockwise 90 degrees, until the panel 29 is again opposite the opening 13, the engagement of the pin 60, on solenoid core 53, with the remote end of the slot 63 limiting said return clockwise movement of the rotor 18 to its normal signaling position as shown in Figs. 1 and 4.

When the driver of the car decides to turn the car to the left he swings the switch member 112 to the left until the annular contact 113 bridges the contacts 83 and 95, whereupon current flows from battery 73 through leads 74, 75 and 82, contacts 83, 113 and 95, lead 96, coil 51 of solenoid 41, leads 97 and 94 to ground 90, and from ground 73 through lead 72 back to battery 70, and the core 54 is drawn into said solenoid coil against the abutment 57, whereby the rod 43 is moved correspondingly with said core and the signal rotor, through said rod, cable 45 and pulley 44, is rotated counter-clockwise 180 degrees (Fig. 4) until the rotor panel 31 is brought opposite the opening 13 in plate 10, so that said panel and the words thereon, "I turn left," are exposed through said opening and lighted by the lights 19 and 20, the rotor 18 being limited in its 180 degree counter-clockwise movement by the engagement of the pin 61 on the solenoid core 54 with the left end of the slot 64 (Fig. 7).

When the driver of the car decides to stop the car he swings the switch member 112 until the annular contact 113 bridges the contacts 83 and 98, whereupon current flows from battery 73 through leads 74, 75 and 82, contacts 83, 113 and 98, lead 99, coil 52 of solenoid 42, leads 100 and 94 to ground 90, and from ground 73 through lead 72 back to battery 70, and the core 55 is drawn into said solenoid coil against the abutment 58, whereby the rod 43 is moved correspondingly with said core and the signal rotor, through said rod cable 45 and pulley 44, is rotated counter-clockwise 270 degrees (Fig. 4) until the rotor panel 32 is brought opposite the opening 13 in plate 10, so that said panel and the word "Stop" are exposed through said opening and lighted by the lights 19 and 20, the rotor being limited in its said 270 degree counter-clockwise movement by the engagement of the pin 62 on solenoid core 55 with the left end of the slot 65 (Fig. 7).

I claim:

In combination, a plurality of solenoids of different lengths, a tube extending through the coils of all of said solenoids in which tube the cores of said solenoids are slidable, a rod extending through said tube and said cores which cores are slidable on said rod, abutments on said rod to be engaged by said cores, respectively, to move said rod, when said solenoids are respectively energized, said tube being provided with longitudinal slots, and pins on said solenoid cores respectively extending through said slots, respectively, for engaging the ends of said slots for limiting the movement of said cores respectively.

JACOB LANDE.